No. 644,042. Patented Feb. 20, 1900.
A. R. COLBURN.
BICYCLE.
(Application filed Dec. 22, 1898.)
(No Model.) 2 Sheets—Sheet 1.
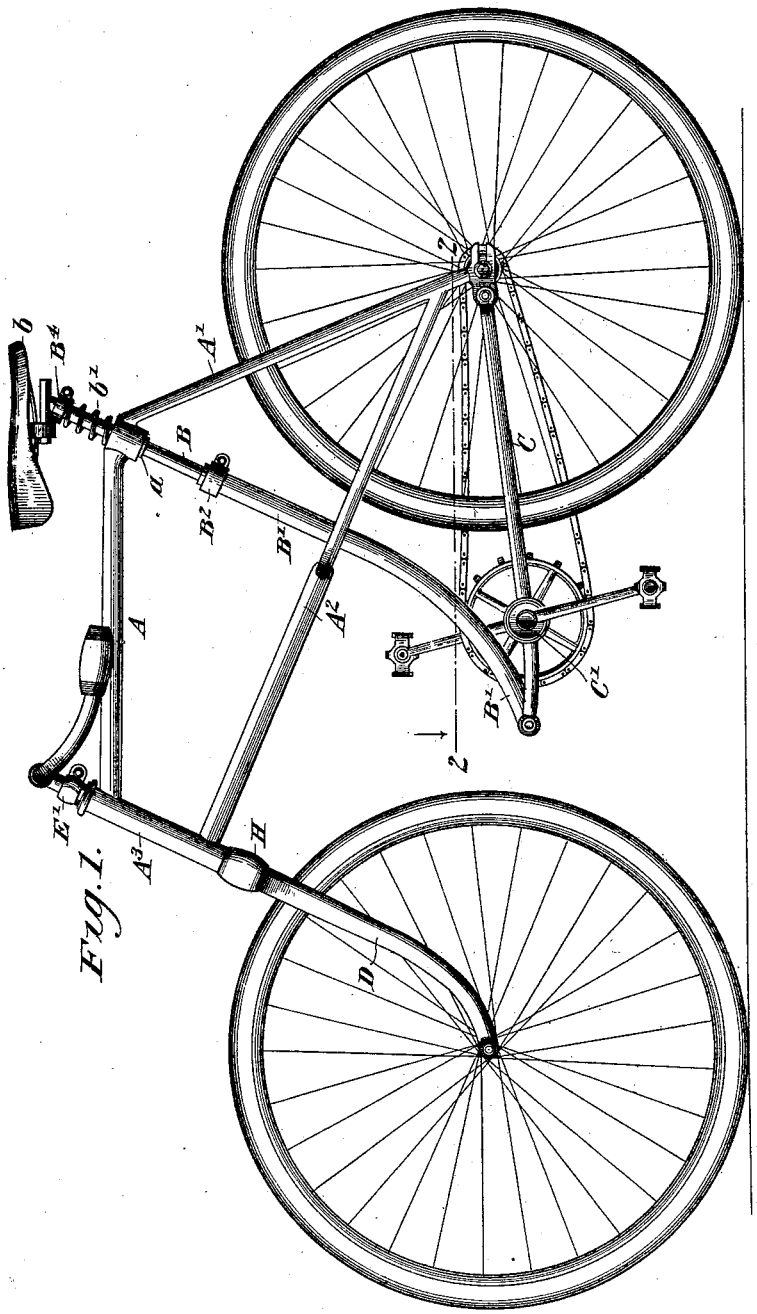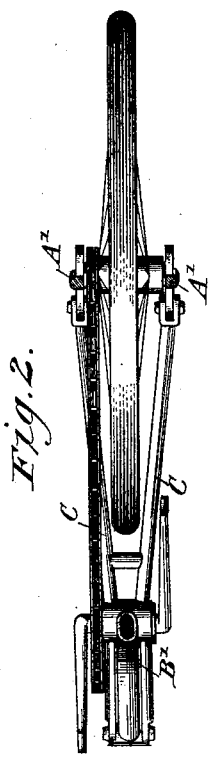
Witnesses
Inventor
Arthur R. Colburn,
By Alexander Dowell
Attorneys No. 644,042. Patented Feb. 20, 1900.
A. R. COLBURN.
BICYCLE.
(Application filed Dec. 22, 1898.)
(No Model.) 2 Sheets—Sheet 2.
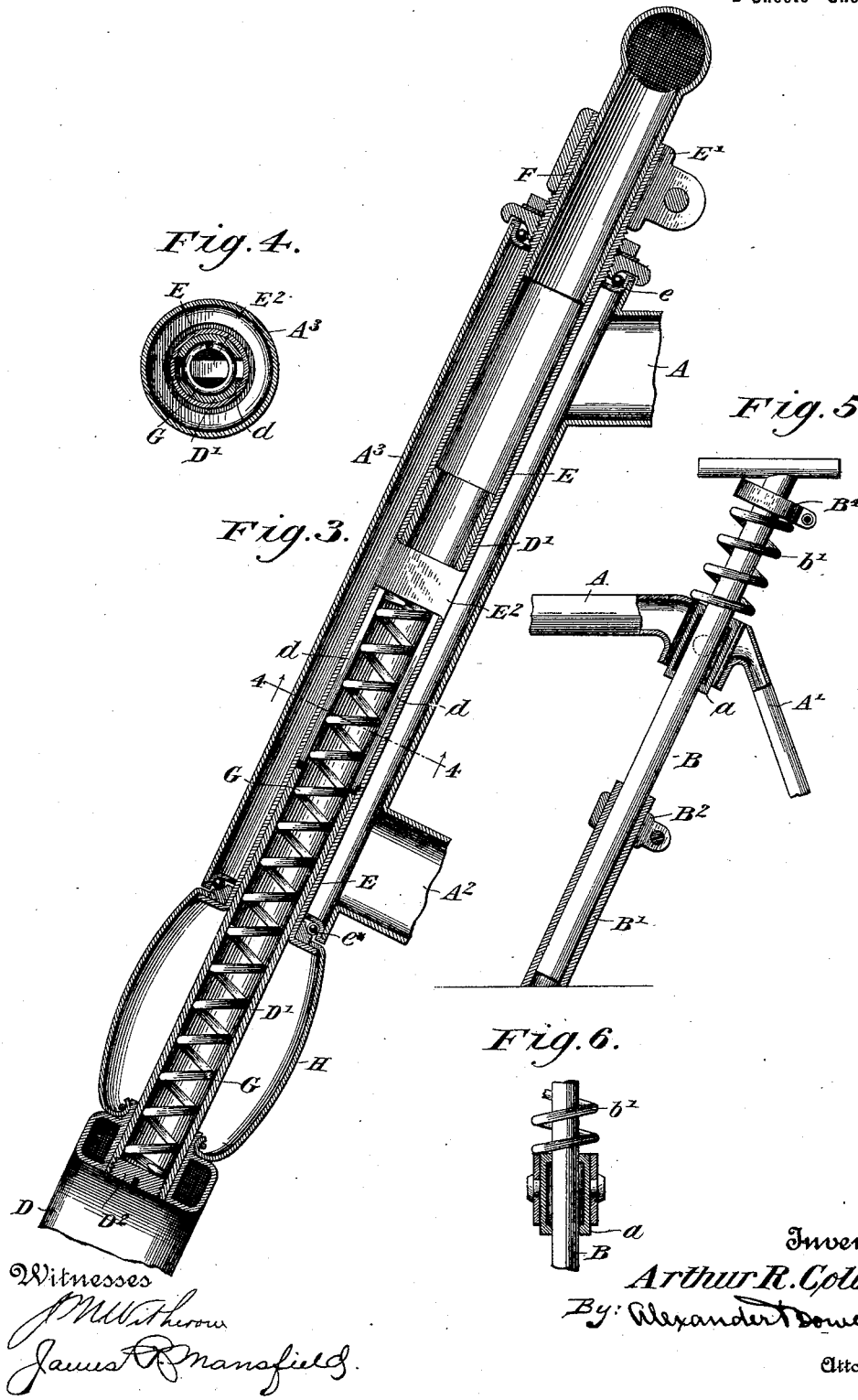
Witnesses
Inventor
Arthur R. Colburn
By Alexander Howell
Attorneys

UNITED STATES PATENT OFFICE.

ARTHUR R. COLBURN, OF WASHINGTON, DISTRICT OF COLUMBIA.

BICYCLE.

SPECIFICATION forming part of Letters Patent No. 644,042, dated February 20, 1900.

Application filed December 22, 1898. Serial No. 700,008. (No model.)

*To all whom it may concern:*

Be it known that I, ARTHUR R. COLBURN, of Washington, in the District of Columbia, have invented certain new and useful Improvements in Bicycles; and I hereby declare that the following is a full, clear, and exact description thereof, reference being had to the accompanying drawings, which form part of this specification.

This invention is an improvement in bicycles and other vehicles of a like nature. Its general object and nature are to cushion the seat upon the frame and the frame upon the front wheel, so that the jars and shocks incident to the travel of the machine over rough roads will be minimized in their transmission to the rider and to the frame.

Particular objects of the invention are, first, to provide an improved cushion-seat for the rider, while maintaining a uniform distance between the seat and the pedals, so that the rider's feet will not be thrown off the pedals by jarring; second, and most important, to maintain a uniform weight upon the seat-supporting spring by preventing the development of any increased pressure thereon by reason of the leverage of the crank during the propelling stroke thereof; third, to enable the distance between the seat and crank-axle to be readily adjusted to suit the rider without affecting the supporting-spring and without varying the normal height of the seat above the frame; fourth, to provide a cushioning or yielding connection between the front fork and the main frame, so that the shocks and vibrations of the front fork will be obviated or materially lessened in their transmission to the main frame and handle-bars, and, fifth, to govern the front fork by the handle-bars independently of the spring, also to conceal the spring from view and protect the same from injury, and, withal, to present such construction that if either of the said supporting-springs should break the safety of the bicycle would not thereby be impaired, as it could be ridden until repaired at the rider's convenience.

The invention therefore consists in the novel constructions and combinations of parts hereinafter described, and particularly summarized in the claims, and the accompanying drawings illustrate a bicycle embodying my invention and which I shall now proceed to describe.

Figure 1 is a side elevation of the complete bicycle. Fig. 2 is an enlarged detail sectional view of the swinging fork, seat-standard, and connections. Fig. 3 is a detail sectional view of the steering-head and connections. Fig. 4 is a transverse section through the steering-head on line 4 4, Fig. 3. Fig. 5 is a detail section through the adjustable seat-standard and guide therefor on the main frame. Fig. 6 is a detail section through the seat-standard guide.

The main frame of the bicycle is composed of an upper rigid bar A, which may be straight or dropped, a rear fork A', front steering-head $A^3$, and lower fork $A^2$, the bifurcations of which are connected to the bifurcations of fork A' just above the axle of the rear wheel, while the tang of the fork $A^2$ is connected to the lower portion of the steering-head $A^3$, as shown. This forms a very stiff strong frame. Pivoted in a slot in the main frame, near the junction of the parts A', is a substantially-vertical guide-sleeve $a$, which can swing slightly in the plane of the frame. Through this sleeve passes the upper member B of a telescopic seat-standard, to which the seat $b$ is attached, the seat and standard being upheld by a coiled spring $b'$, interposed between the seat and the guide $a$. The upper member B of the standard telescopes into the lower member B', which is preferably a tube, and is pivotally connected at its lower end to the forward end of a swinging fork C, which has a pivotal connection at its rear end to the main frame or to the axle of the rear wheel and which carries the crank-axle bracket C', which may be of usual construction, or the other propelling mechanism.

It will be observed from the drawings that instead of connecting the tube B' to the lower fork at the crank-bracket C' the lower fork is extended beyond the crank-bracket, and the tube B' is connected thereto some distance in advance of the crank-shaft. The object of this peculiar connection is to prevent the increase in leverage due to the propelling stroke of the cranks, increasing the weight or pressure upon the spring $b'$, for this spring $b'$, it will be observed, not only supports the seat, but it also upholds the seat-standard, the lower swinging fork, the crank-bracket and cranks, and sprocket-driving gear, all of said parts being cushioned upon the rigid main frame by the spring $b'$.

In practice I have found that if the point of connection between the tube B' and the fork C is placed in advance of the crank-bracket C' and as distant therefrom as the length of the pedal-cranks then the increase of pressure or weight upon the spring $b'$ due to the forward downstroke of the pedals is prevented or obviated, whereas if the tube B' is connected to the lower fork at the crank-bracket C' there is considerable increase in pressure upon the spring due to the increased leverage exerted by the practical prolongation of the forks C when the pedals are on their forward downward stroke—that is, the leverage exerted upon the pivots of the swinging fork C is greater when the pedals are in their foremost position than when the weight is removed from the cranks and resting in the seat or just vertically above or below the crank-bracket—and this increase of leverage would of course result in extra pressure upon the spring $b'$, which may amount to two-fifths of the weight of the rider if the saddle-standard is connected to fork C at the bracket C'; but by making the connection between the seat-standard and the swinging fork in advance of the bracket C' the effect of this crank leverage upon the spring $b'$ may be lessened or entirely obviated, as desired. Practically I propose to make this connection between the tube B' and fork C so far in advance of the crank-hanger C' that the weight upon the spring $b'$ will be practically constant, and only that of the parts ordinarily upheld by the spring and the rider. By thus maintaining a uniform weight upon the spring $b'$ the machine will ride more easily and smoothly, and there will be no vertical vibration of the rider due to the pedal leverage, which is noticeable in the spring-frame bicycles as heretofore constructed.

The part B of the standard telescopes into part B', as described, or vice versa; but when adjusted the parts are secured by a clamping-ring $B^2$. By loosening this clamping-ring the pedal-bracket C' and fork C can be adjusted toward or from the seat, as is obvious, the parts B B' telescoping until the pedals are adjusted to the proper distance from the seat to suit the rider. Then the clamp is tightened, and the pedals will be maintained uniformly at that distance from the seat to which they are adjusted, as the crank-hanger of course moves uniformly and exactly with the seat. The height of the seat and pedals from the ground can be adjusted by the binder $B^4$ upon the seat-post B, up against which the spring $b'$ presses. As above stated, the frame is cushioned upon the front wheel and fork D by the following means: This fork D is provided with a tubular tang or standard D', which telescopes into a rotatable steering-sleeve E, secured by the ordinary ball-bearings $e$ $e'$ in the steering-head $A^3$, this sleeve E being substantially like and occupying the same position as the shank of the fork-rod in ordinary bicycles. The steering-sleeve E projects above the upper ball-bearing and is provided with the usual clamp E', by which the shank F of the handle-bars is secured to the sleeve. The fork-tube D' is provided near its upper end with opposite longitudinal slots $d$, in which plays a pin $E^2$, rigidly secured to the sleeve E. A spring G is interposed between the pin $E^2$ and the bottom of the fork-tube D, which may be provided with a plug $D^2$. The tube E at its lower end is flanged outwardly to support the lower cone of the bearings $e'$. It will be observed by reference to Fig. 5 that in this construction the main frame is yieldingly supported by the spring G upon the front fork D and that the shocks of the front wheel $w$ will be cushioned in their transmission to the frame by said spring, the fork-tube D' telescoping freely within the steering-sleeve E. The pin $E^2$ not only serves as a support for the frame upon the spring G, but it also prevents the fork-tube D' and steering-sleeve E rotating independently of each other. Consequently the front fork can be rotated and guided by the rotation of sleeve E, the front fork having a vertical play in tube E, but no rotatable play therein.

A suitable dust-excluder may be interposed between the lower end of the steering-head $A^3$ and the upper end of the fork D. I have shown a tubular resilient protector H interposed between the steering-head and fork, this protector being tightly connected at its upper end to the lower end of the tube E, which is flanged outwardly over the lower ball-race, while the lower end of said protector is rigidly secured in a groove or channel in the upper end of the front fork. After the distance between the seat and pedals has been adjusted to suit the rider by telescoping the parts B B' of the seat-standard and securing them in their adjusted position by the clamp $B^2$ the height of the pedal-cranks above the ground and of the seat above the frame can be regulated by means of the adjustable clamp $b^2$ upon the bar B of the standard above the frame, which affords a bearing on the standard for the spring $b'$. By loosening the clamp $B^2$ the seat-standard and connected parts can be raised relatively to the frame, while the clamp is slipped down on part B of the standard until it rests upon the spring $b'$ and then is clamped to the part B, securing the parts in the position to which they have been adjusted. By this means the rider can adjust the pedals to run high or low and have the effect of a high or low frame as he prefers.

It will be observed that the clamp $B^4$ is used to adjust the height of the seat-standard and the pedals relatively to the frame—that is, by loosening said clamp the seat-standard, seat, and pedals can be adjusted up or down relatively to the frame by slipping clamp B⁴ up or down on this part B of the standard and then securing the clamp thereto, and in case of the spring $b'$ of course it is used to increase the comfort and cushion the shock of the rider; but should the spring break or should the rider desire to do away with this spring for any purpose, as he might wish to in racing, the spring can be removed and the clamp B⁴ lowered so as to rest directly upon the sleeve $a$. Thus the spring $b'$ is not essential to the operativeness of the bicycle, although it is essential to comfort. It will also be observed that the tubular shank D' of the steering-head projects some distance out of and below the steering-sleeve and steering-head. This enables the cushion-spring G to be placed below the stop-pin E² and to also project below and out of the steering head and sleeve. I am thus enabled to use a very long coiled spring, which gives a much greater cushioning effect than would be possible if the spring were inserted around the shank between the fork and head or if it were intended to confine the spring entirely within the head, both of which constructions are defective in that the spring is necessarily so short that sufficient play of the fork is not provided for. At the same time by reason of the slant of the steering-head and fork the shank must extend a considerable distance into the tube to allow sufficient friction-surface, one in the other, when in the extended position shown in Fig. 3 in order to absorb vibrations and concussions, while a clear space must be left between the upper end of the shank and the lower end of the handle-bar stem F, which must extend below the upper bearings for strength. A coiled spring of small diameter—three-fourths of an inch, for example—and of sufficient strength for this purpose has but a small amount of compressibility in proportion to its length. The spring, as shown in Fig. 3, is already compressed to exert a pressure equal to that portion of the rider's weight which is ordinarily carried by the front wheel. Therefore in order to stand the additional compression of one and one-half inches or two inches, as provided for in the construction shown, the spring must necessarily be of at least the length shown. Thus all the exacting conditions and requirements have been met and complied with in the construction shown.

Having thus described my invention, what I therefore claim as new, and desire to secure by Letters Patent thereon, is—

1. The combination of the main frame, the vertically-adjustable and telescopic seat-standard whereby both the distance between the seat and the pedals can be adjusted and also the distance of the seat and pedals above the ground, said standard passing through the upper part of the frame and connected at its lower end to the crank-bracket support, and an adjustable clamp on said standard, above the frame, substantially as described.

2. The combination of the main frame, the pedal-crank-bracket support connected thereto, the vertically-adjustable telescopic seat-standard whereby both the distance between the seat and the pedals can be adjusted and also the distance of the seat and pedals above the ground, said standard passing through a guide in the upper part of the frame and connected at its lower end to said support, an adjustable clamp on the upper end of said standard, above the frame, and a spring interposed between said adjustable clamp and the frame, substantially as described.

3. The combination of the main frame, the swinging fork, the crank-bracket thereon, and a seat-standard guide in the upper portion of the frame; with an adjustable telescopic seat-standard whereby both the distance between the seat and the pedals can be adjusted and also the distance of the seat and pedals above the ground, said standard connected at its lower end to the said swinging fork and having its upper end playing through said guide, and an adjustable clamp on the upper end of said standard above the guide, substantially as described.

4. The combination of the main frame, the swinging fork, the crank-bracket supported thereon, and the guide-sleeve pivoted in the upper portion of the frame; with the vertically-adjustable and telescopic seat-standard whereby the distance between the seat and pedals can be adjusted said standard being connected at its lower end to the said swinging fork and having its upper end playing through said guide, an adjustable clamp on the upper end of said standard above the guide, said standard being adjusted relatively to the frame so as to hold the seat and pedals in the desired position above the ground and a spring interposed between said clamp and the guide, for the purpose and substantially as described.

5. In a bicycle, the combination of the rigid main frame, the guide-sleeve pivoted thereto, the swinging fork pivoted to the frame near the rear axle and carrying the driving mechanism, the extensible seat-standard consisting of an upper part playing through said guide, and a lower part telescoping with the upper part and pivoted at its lower end to the swinging fork, a seat attached to the upper member of the standard above said guide-sleeve, and the spring whereby said seat-standard and swinging fork are suspended from and cushioned upon the main frame, for the purpose and substantially as described.

6. In a bicycle, the combination of the rigid main frame, the guide-sleeve pivoted thereto, the swinging fork pivoted to the frame near the rear axle and carrying the crank-bracket and shaft, the extensible seat-standand playing through said guide and pivoted at its lower end to the swinging fork at a point in advance of the crank-bracket thereon, a seat attached to the upper member of the standard above said guide-sleeve and the spring interposed between said seat and tube, whereby said seat-standard and swinging fork are suspended from and cushioned upon the main frame, for the purpose and substantially as described.

7. In a bicycle, the combination of the steering-head, the steering-sleeve rotatably journaled therein, the front fork having a tubular shank telescoping with said sleeve but extending below the sleeve and head, and means for preventing the shank rotating in the sleeve but permitting it to telescope therewith, with a coiled spring within said tubular shank and bearing against a stop in said sleeve, said spring extending to the lower end of said shank outside of the head and supporting and cushioning the steering head and sleeve on the fork, substantially as described.

8. In a bicycle, the combination of the steering-head, the steering-sleeve rotatably journaled therein having a tubular shank telescoping with said sleeve and projecting out of and below the head and sleeve, a vertical slot and transverse pin connection between said sleeve and shank within the head, whereby telescopic play is permitted but independent rotatable movement of the sleeve and fork prevented, and the spring within said tubular shank and extending therein outside of the sleeve and head, said spring bearing against said pin, and supporting and cushioning the steering head and sleeve on the fork, substantially as described.

9. The combination of the rigid frame connecting the front fork and rear axle, a swinging fork below and pivotally connected to said frame near the rear axle, the crank-bracket mounted on said fork in rear of the front end thereof, a swinging guide in the top part of the frame, a vertically-movable seat-standard playing through said guide and pivotally connected at its lower end to the forward extremity of the swinging fork at a point in advance of the crank-hanger, a spring for supporting said standard, the pivotal connection between the standard and the front end of said swinging fork, such pivotal connection being substantially removed the length of a crank on the crank-shaft from the crank-hanger, substantially as described.

10. The combination of the main frame, the steering-head, and the steering-sleeve rotatably journaled therein, provided with handle-attaching devices at its upper end; with a front fork having a tubular shank telescoping in said sleeve, and also having diametrically-opposite vertical slots with a pin within the head transfixed in the said slots and rigidly attached to said sleeve, a spring within the tubular shank interposed between said pin and the base of the said tube, and a dust-excluder interposed between the steering-sleeve and the fork, substantially as described.

11. The combination of the rigid frame, a swinging fork lying below the frame and pivotally connected thereto near the rear axle, the crank-hanger mounted on said fork in advance of the rear wheel, said movable fork extending forward beyond the crank-hanger, and a vertically-movable seat-standard connected to the frame at its upper end and pivotally connected at its lower end to the forward extremity of the swinging fork at a point in advance of the crank-hanger, and a spring supporting said seat-standard and swinging fork on the rigid frame, substantially as described.

12. In a bicycle, the combination of the rigid frame, connected to the steering-fork and rear axle, a swinging fork below said frame connected thereto near the rear axle, the crank-hanger attached to said swinging fork in rear of its front end, and the vertically-movable seat-standard slidably connected to said frame at one end and pivotally connected at its lower end to the front end of said swinging fork in advance of the crank-hanger, for the purpose and substantially as described.

In testimony that I claim the foregoing as my own I affix my signature in presence of two witnesses.

ARTHUR R. COLBURN.

Witnesses:
F. W. McREYNOLDS,
HOMER GUERRY.